Dec. 4, 1956 C. E. LOMAX 2,773,126
AUTOMATIC TELEPHONE SYSTEM PROVIDED WITH PARTY LINES AND TRUNK LINES
Filed Jan. 13, 1955 3 Sheets-Sheet 1

INVENTOR.
Clarence E. Lomax
BY
Smith, Olsen, Baird & Gulbrandsen
Attys.

INVENTOR.
Clarence E. Lomax
BY
Smith, Olsen, Baird & Gulbrandsen
Attys.

Dec. 4, 1956

C. E. LOMAX

AUTOMATIC TELEPHONE SYSTEM PROVIDED WITH PARTY LINES AND TRUNK LINES 2,773,126

Filed Jan. 13, 1955

3 Sheets-Sheet 3

INVENTOR.
Clarence E. Lomax

BY
Smith, Olsen, Baird & Gulbrandsen
Attys.

2,773,126

AUTOMATIC TELEPHONE SYSTEM PROVIDED WITH PARTY LINES AND TRUNK LINES

Clarence E. Lomax, Chicago, Ill., assignor to Automatic Electric Laboratories, Inc., Chicago, Ill., a corporation of Delaware Application January 13, 1955, Serial No. 481,567

8 Claims. (Cl. 179—17)

Figure 1:
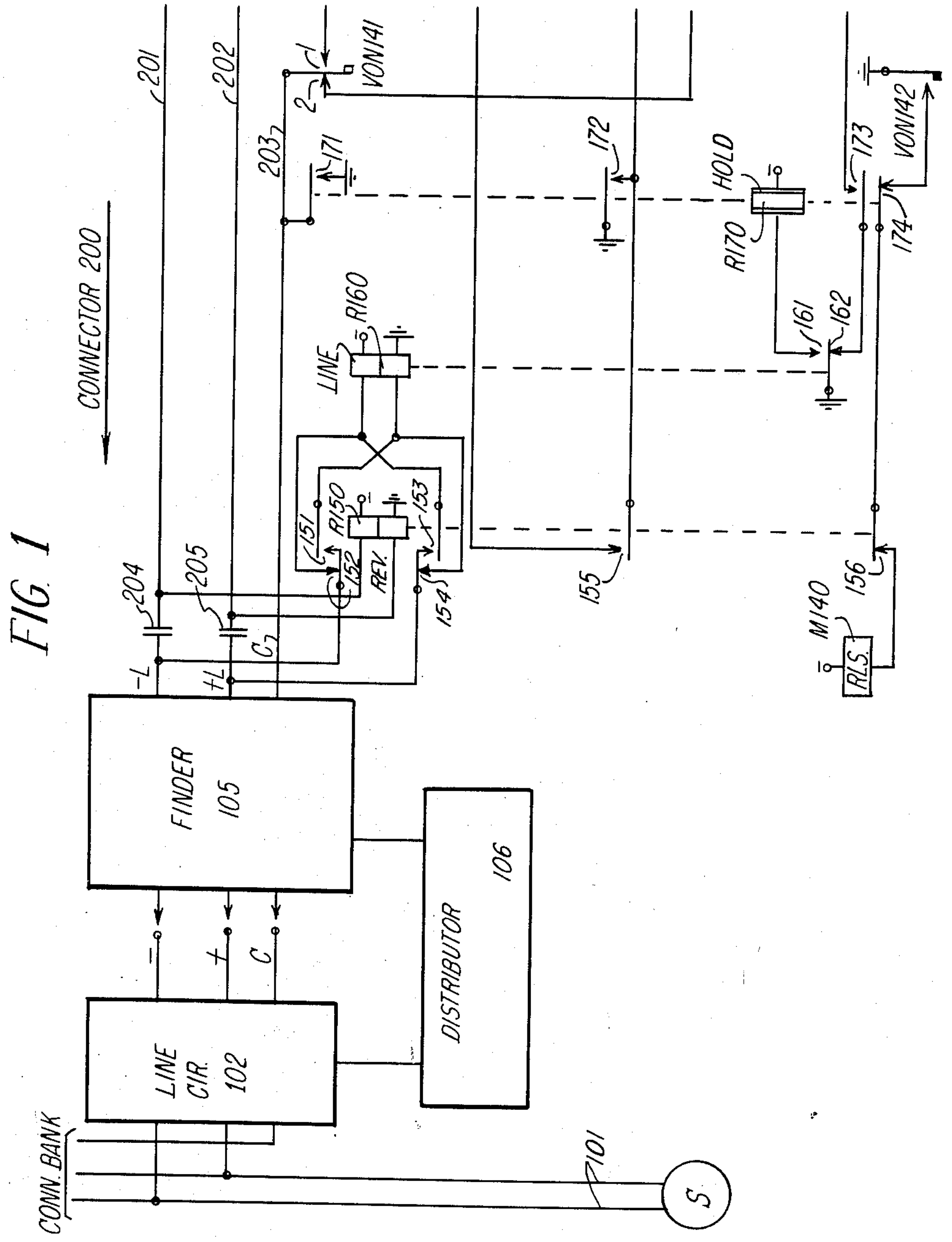

The present invention relates to automatic telephone systems and particularly to such systems including party lines and trunk lines served by a common connector.

In automatic telephone systems providing party line service on a terminal per station basis and using harmonic ringing, it is conventional to use a different group of connectors for each required ringing frequency. Thus, to serve one hundred party lines having four parties per line, it is necessary to provide four groups of one hundred line connectors. Inasmuch as the party lines served by an exchange are not usually in the numbers of one hundred and all of those party lines that are served do not usually have four parties per line connected thereto, the connectors are not used to full capacity and are therefore inefficient. Further, as these party lines are in most instances residence lines, they are used most actively only during the evening hours.

In many exchanges, there is need for serving, in addition to the party residence lines, business subscribers who have two or more lines and which lines require automatic trunk hunting service. Generally, trunk hunting service must be provided over special or P. B. X connectors which, though slightly different in structure, are generally similar to ordinary line connectors. Inasmuch as these business lines have their heaviest incoming load during the work day, the condition is found that at one time the business subscriber class of connectors is exceedingly busy while the party line class is idle. The periodic heavy use of one class of connectors while the other class is more or less inactive is not only inefficient but expensive because of the required duplication of similar equipment and the space required to house the equipment. Further, the monetary return per unit of equipment is low due to the long periods of non-use and the cost of maintaining the substantial duplication of equipment.

It is a general object of the invention to provide an improved automatic telephone system wherein party and trunk lines are served by a common connector.

A further object of this invention is to provide an improved telephone system in which all of the stations on a party line, individual stations and P. B. X stations, are served from a common connector on a harmonic ringing basis.

A still further object is to provide an automatic telephone system in which the stations on a party line, individual stations and P. B. X stations, are served through a common connector and the connector provides automatic rotary service to the P. B. X stations.

An additional object of the invention is to provide an improved automatic telephone system in which trunk lines provided with automatic trunk hunting service and party lines are served from a common connector and in which one station of a party line may be connected to the contact level providing automatic rotary service to the trunk lines.

Another object of the invention is to provide an improved ringing control circuit to selectively furnish ringing signals to party lines, individual lines and trunk lines connected to a common conductor.

Another object of the invention is to provide an improved ringing control arrangement of the harmonic type wherein frequency selection is based upon a test made through the connector employing a plurality of ringing signals matched with respect to corresponding marking potentials.

Further features of the invention pertain to the particular arrangement of the circuit elements of the telephone system, whereby the above outlined and additional operating features thereof are attained.

Figure 2:
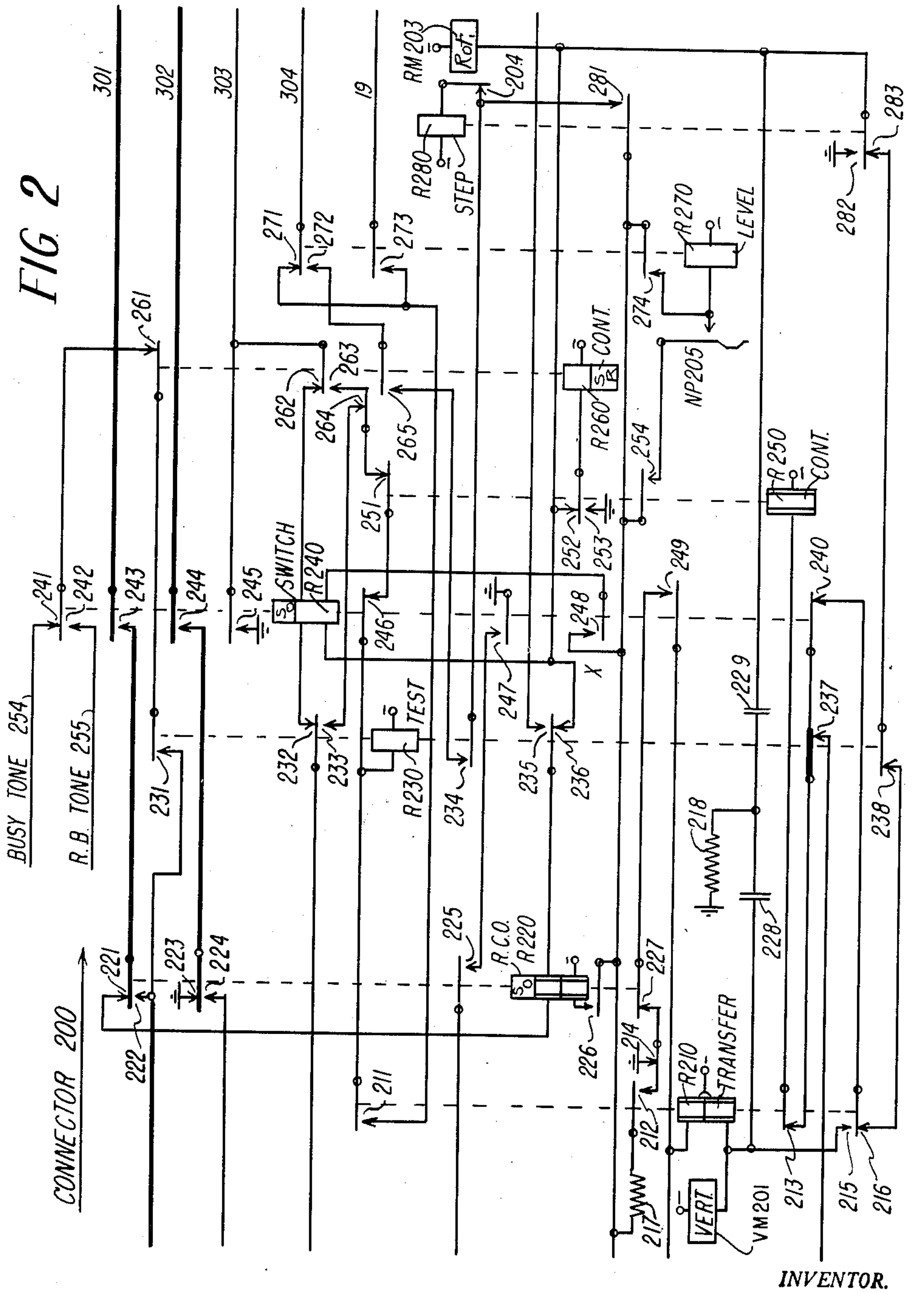
Figure 3:
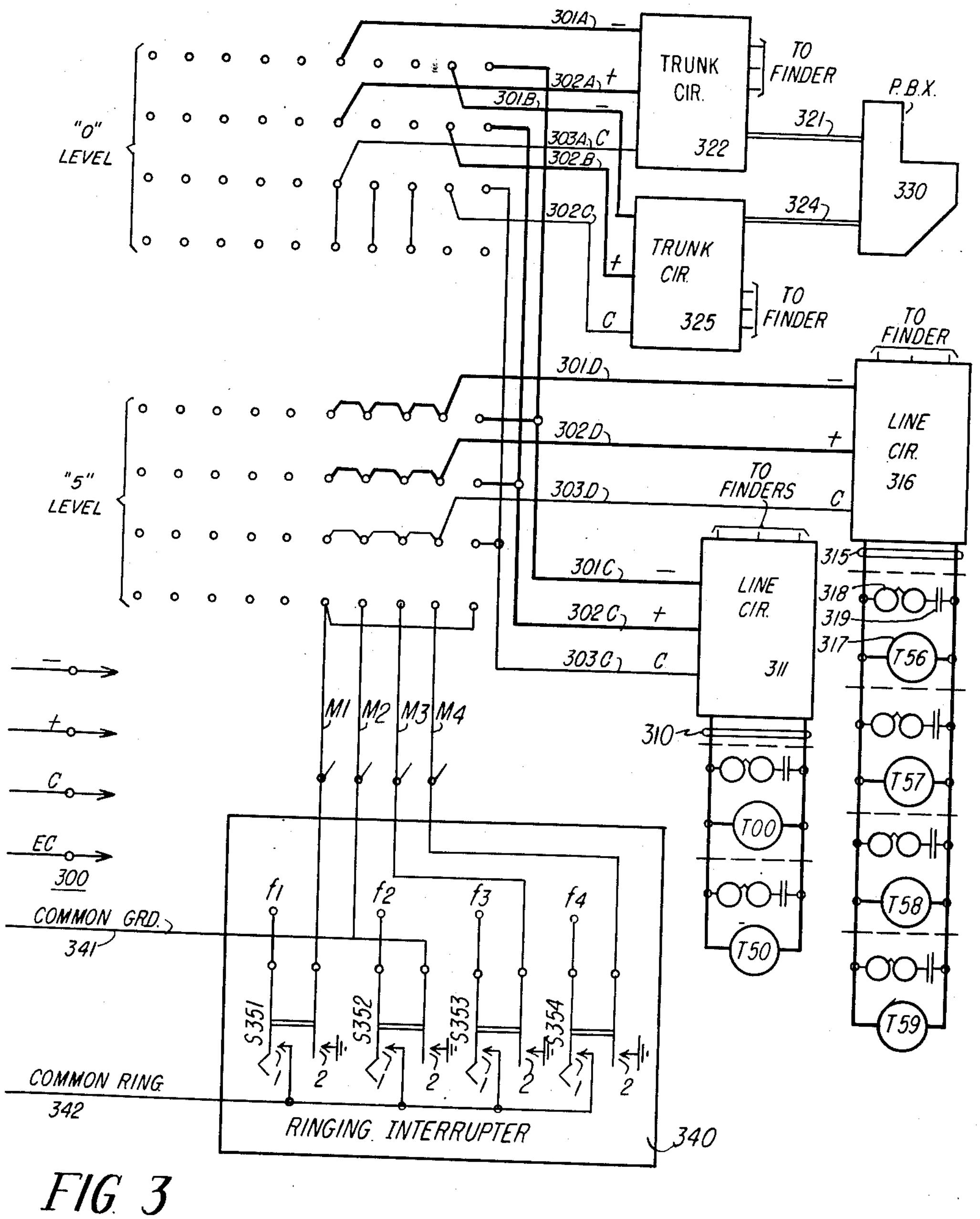

The invention, both as to its organization and method of operation, together with further objects and advantages thereof, will be best understood by reference to the following specification and the drawings, forming a part thereof, wherein Figs. 1 to 3, inclusive, taken together, illustrate the details of an automatic telephone system provided with party lines and P. B. X stations and incorporating therein the features of the present invention. In the drawings, Figs. 1 to 3, inclusive, should be arranged respectively from left to right.

Referring more particularly to the drawings, there is illustrated therein an automatic telephone system comprising an exchange serving a number of subscriber lines including private subscriber line 101 extending to the private subscriber station S, P. B. X lines 321 through 324 (322 and 323 not shown) extending to P. B. X board 330, a group of party subscriber lines including the two-party subscriber line 310 extending to stations T00 and T50, and the four-party subscriber line 315 extending to stations indicated as T56 and T59 inclusive. The P. B. X board 330 and the party line station, by way of illustration, are chosen to be of the terminal per station harmonic ringing type though code ringing might also be employed. The station S might be on an individual or party line and rung by harmonic or code means, and all of the stations are comprised of conventional station apparatus. By way of illustration, the equipped first station T56 on line 315 is shown in schematic form and as shown includes apparatus 317 representing the transmitter, the receiver and dial equipment, ringer 318 operatively connected across the line 315 via the associated capacitor 319 and hook switch circuit (not shown).

The apparatus provided at the other equipped stations, in both the two-party and four-party lines, include the same elements as in station T56. In the telephone system, four ringing frequencies and a bridged ringing arrangement is provided whereby each equipped station on any party line is rung in each ringing cycle with a different ringing frequency, which may be 66 cycles, 54 cycles, 33 cycles and 25 cycles. For effective operation, no two stations on a party line should be rung at the same frequency.

Also, each private and party subscriber line and the P. B. X trunk is provided with a line or trunk circuit individual thereto, the private line 101 having the associated line circuit 102, the trunk line 321 having associated the trunk circuit 322, the trunk line 324 having associated the trunk circuit 325, and the party lines 310 and 315 having associated the line circuits 311 and 316, respectively. The line circuits 102, 311 and 316 may be identical and of a conventional form. Similarly, the trunk circuits 322 and 325 are conventional and identical.

Also, the system comprises a distributor 106 of any conventional type operatively associated with the line and trunk circuits 102, 311, 316, 322 and 325 as well as plurality of finder-connector links. One of the links is illustrated and comprises a finder 105 shown in box schematic form of any suitable type although preferably Strowger type and a connector 200 of the Strowger type, As illustrated, the connector 200 comprises a Strowger mechanism 300 including a wiper set, a vertical magnet VM201 for driving the wiper carriage step by step in the vertical direction away from its normal vertical position, a rotary magnet RM203 for driving the wiper carriage step by step in the rotary direction away from its normal rotary position, and a release magnet M140 for releasing the wiper carriage and for causing it to be returned into its normal rotary and vertical positions. Also associated with the wiper carriage of the Strowger mechanism 300 are two sets of vertical off normal springs VON141 and VON142 that are operated when the wiper carriage is driven in a vertical direction away from its normal vertical position. Additionally the wiper carriage has associated with it a set of normal post springs NP205 that are operated, or closed, when the wiper set is posted at a given vertical level and are normal, or open, when the wiper set is at any other level. The wiper set includes a pair of line wipers, a control or C wiper and an extra control or EC wiper. In addition, the Strowger mechanism 300 includes a contact bank 305 including a plurality of levels, each level including a plurality of contact sets, and each contact set including contacts for engaging respectively the individual wipers of the wiper set. In Fig. 3, only two bank contact levels are illustrated, respectively, the "0" level and the "5" level, although there are ten, and there are ten contact sets per level.

The "0" level has been designated, arbitrarily, for purposes of illustration, the P. B. X automatic trunk hunting level although the plurality of contact sets therein are not necessarily limited to automatic trunk hunting or even trunk use and may, in accordance with the invention, serve individual and/or party subscriber lines, the latter of which is shown. In the "0" level, the contact sets reserved for P. B. X trunk use are each connected to an individual trunk circuit. However, for simplicity, only two trunk circuits, 322 and 325, are shown connected to the contact sets by conductors 301A, 302A and 303A, and 301B, 302B and 303B respectively, it being realized that two additional trunk circuits are required for the two other contact sets reserved for P. B. X trunk use. In the first three contact sets reserved for trunk use, the C and EC contacts are shown strapped in order to provide for P. B. X trunk hunting service which is described in detail hereinafter.

Further, the party line 315 being of terminal per station and frequency ringing type is shown connected through the line circuit 316 to contact sets in the "5" level wherein line conductors 301D and 302D and the control conductor 303D are shown strapped to respective contacts in contact sets equal in number to the stations on the party line.

Further, the connector 200 comprises a relay group including a reversed battery relay R150, a line relay R160, a hold relay R170, a transfer relay R210, a ring cut-off relay R220, a test relay R230, a switch relay R240, two control relays R250 and R260, a level relay R270 and a rotary step relay R280.

Also, the exchange comprises common equipment including ring interrupter 340 of a conventional type adapted to provide cyclically and sequentially frequencies $f1$, $f2$, $f3$ and $f4$ which may be, for example, 66 cycles, 54 cycles, 33 cycles and 25 cycles, respectively. In addition, the ring interrupter also provides a plurality of ground pulses which are individually contemporaneous with and matched to each ringing frequency and are individually applied to the EC terminals of bank contacts and to the connector 200.

Specifically, the ringing interrupter 340 includes the switch springs S351 through S354. Each switch includes two springs and contact points 1 and 2 individual to each of the switch springs which are made to move in unison by an insulator bar connected there between. Contact 1 of each switch connects a ringing frequency to a common ringing conductor 342 and contact 2 extends ground potential to a marking conductor. Thus when the contacts of switch S351 are closed, a ringing signal of a frequency $f1$ is extended to conductor 342 and ground potential is extended to conductor M1. A short time later, the contacts of S352 are closed and the ringing signal $f2$ and ground potential are extended respectively to 342 and M2. Still later S353 is operated extending $f3$ to 342 and ground to M3, and S354 is operated extending $f4$ to 342 and ground to M4. As these switches are operated cyclically and sequentially in the manner described a continuous chain of signal frequencies appear on the conductor 342 and ground pulses appear intermittently and regularly on conductors M1, M2, M3 and M4. The effect of the operation of the ringing interrupter in a telephone system in accordance with the invention will be understood from a detailed description given hereinafter.

In the telephone system, each private subscriber station, each P. B. X station and each party subscriber substation is designated by a two digit directory number individual thereto. The first digit indicates the vertical bank level and the second digit indicates the contact set in the bank level in the connector 200, etc. terminating the associated subscriber line.

The mode of operation of the apparatus incorporated in the telephone system will be better understood from the following description of calls involving the various subscriber stations and P. B. X trunks.

First assuming that a call is initiated at the private subscriber station S, the associated line circuit 102 is controlled in order to call the distributor 106 to assign an idle link such, for example, as that illustrated and to control operation of the finder 105 thereof to find the subscriber line 101 extending to the calling private subscriber station S. When the finder finds the subscriber line 101, the line circuit 102 is controlled in order to mark the subscriber line 101 as busy to the connectors 200, etc. having access thereto and to dismiss the distributor 106. At this time, a loop circuit is completed for energizing in series the upper and lower windings of the line relay R160, which includes the finder 105 and the subscriber line 101 extending to the calling station S; whereby the line relay R160 operates to complete at its contacts 161 a circuit for operating the hold relay R170. Upon operating, the hold relay R170 closes the contact 171 applying ground potential to the C conductor 203 to retain the finder 105 and line circuit 102 in their operated positions. The operation of the hold relay R170 causes ground to be applied thru contacts 171, conductor 203, contacts 2 of VON141 and the upper winding of transfer relay R210 to battery to operate the last named relay. Upon operating, the transfer relay R210 prepares at contacts 215 a point in a circuit operating a vertical magnet VM201 of the Strowger mechanism 300. Thus at this time, the call initiated at the calling private subscriber station S has been extended via the subscriber line 101 and the finder 105 to the connector 200, and the connector 200 is conditioned to respond to digits comprising the directory number of the called station.

Assuming that this call is to be extended to the first party station T56 on the party subscriber line 315, the subscriber at the calling subscriber station S dials the two digit directory number of the call first party station T56 which may be 56. The line relay R160 follows the pulses of the first digit 5 and each time the line relay R160 restores and then reoperates, it interrupts and then recompletes at contacts 161 the circuit for energizing the winding of the hold relay R170 whereby the latter relay is retained in its operated position during the dialing as it is of the slow to release type. Also, each time the line relay R160 restores and then reoperates, it completes and then interrupts at the contacts 162 a circuit including the contacts 173, 237 and 240 and 215 for energizing vertical magnet VM201 and in multiple the lower winding of transfer relay R210. Accordingly, the vertical magnet VM201 is operated and restored five times in succession driving the wiper carriage of the Strowger mechanism 300 five steps in the vertical direction away from its normal and the transfer relay R210 is energized by the dialing pulses. When the wiper carriage of the Strowger mechanism is moved a first step in the vertical direction away from its normal vertical position, the sets of vertical off normal switches VON141 and VON142 are operated. Upon operating the switch VON141 interrupts the initial circuit for operating the transfer relay R210 which relay being of the slow to release type is retained operated by the applied dialing pulses. Further, the switch VON142 is operated in order to prepare the circuit traced hereinafter for operating the release magnet M146.

At the conclusion of the first digit 5, the line relay R160 is retained in its operating position, retaining operated the hold relay R170 and causing transfer relay R210 to restore shortly thereafter. Upon restoring, the transfer relay prepares at the contacts 213 a circuit traced hereinafter for operating the control relay R250; interrupts at the contacts 215 the above traced circuit for energizing the vertical magnet VM201 and the lower winding of the transfer relay R210; and then prepares at the contacts 216 a circuit traced hereinafter for operating the rotary magnet RM203.

The subscriber at the calling subscriber station S then proceeds to dial the second digit 6 which dialing is again followed by the line relay R160. Each time the line relay R160 restores and then reoperates, it completes and then interrupts at the contacts 162 the previously prepared circuits for operating the control relay R250 and the rotary magnets RM203 which circuits include, respectively, contacts 237 and 213, and contacts 237, 240 and 216. Accordingly, the control relay R250 operates and because it is of the slow to release type remains operated during the dialing, and the rotary magnet RM203 is operated and restores six times driving the wiper carriage of the Strowger mechanism 300 six steps in the rotary direction away from its normal rotary position. Upon operating, the control relay R250 completes at the contacts 253 a circuit for operating a control relay R260 which relay prepares at contacts 263 a circuit traced hereinafter for testing the busy or idle condition of the called subscriber line. At the conclusion of the second digit 6, the line relay R160 is retained in the operated position retaining operated the hold relay R170 and causing the operating circuit to the control relay R250 and the rotary magnet RM203 to be interrupted at contacts 162. Thus at the end of the dialing of the second digit, the Strowger mechanism 300 has been stepped to the sixth contact set position on the fifth contact bank level and control relays R250 and R260 are operated, they being of the slow to release type. A moment thereafter, control relay R250 is restored and control relay R260 retained operated thereby completing at contacts 251 the previously prepared circuit from the C wiper to R230 for testing the busy or idle condition of the called subscriber line.

First assuming that the called party line 315 is busy at the time, ground potential is on the C conductor 303 thereby completing a circuit through contacts 263, 251 and 246, and the winding of relay R230 to battery for operating the winding of test relay R230. Upon operating test relay R230 prepares at contacts 233 a hold circuit for retaining the test relay in its operated position. This hold circuit including contacts 1 of VON141 is completed at contacts 264 shortly thereafter when control relay R260 restores. Also, R230 completes at contacts 231 a connection between the busy tone conductor 254 and conductor 201, to the subscriber line 101. At this time, busy tone is returned to the calling subscriber station S indicating to the subscriber that the desired connection may not be had at this time due to the busy condition of calling party line 315.

The subscriber at the calling subscriber station S then disconnects thereby interrupting the operating circuit for line relay R160, causing the latter relay to restore and effecting restoration of the slow to release type hold relay R170 shortly thereafter. Upon restoring, the hold relay R170 interrupts at the contacts 171 the circuit for applying ground potential to the control conductor 203 extending to the finder 105 whereby the finder 105 is released causing the line circuit 102 to mark the subscriber line 101 as idle to the connector 200, etc. having access thereto. Further, the interruption of ground at contacts 171 interrupts the previously mentioned hold circuit for retaining operated test relay R230. Also, upon restoring, the hold relay R170 completes at the contacts 174 a circuit including VON142 for operating the release magnet M140. Upon operating, the release magnet M140 reelases the wiper carriage of Strowger mechanism 300 causing it to be returned into its normal rotary and vertical positions. When the wiper carriage of Strowger mechanism 300 is thus released, the vertical off normal switches VON141 and VON142 are operated, VON141 being operated to complete at contacts 2 a circuit to connect battery potential by way of upper winding of transfer relay R210 to the control conductor 203 of finder 105, and VON142 being operated to interrupt the operating circuit for the release magnet M140. At this time, the connector 200 is completely released and available for use.

Now assume that the connector 200 has been operated in response to the second digit 6 dialed at the subscriber station S, and at the conclusion of the dialing of the directory number 56 of the called first party station T56 on the called party line 315, the called party subscriber line 315 is idle. At this time, battery potential from the cut-off relay (not shown) in the line circuit 316 is applied to the control conductor 303 of the connector 200 and that potential is applied to the test relay R230 over a path identical to that previously traced. Accordingly, the test relay R230 is short-circuited and is not operated. Shortly thereafter when the relay R260 restores there is completed at contacts 262 a circuit including the upper winding of relay R240, contacts 232 and contacts 1 of VON141 for operating switch relay R240. Switch relay R240 then operates completing at the contacts 248 a holding circuit extending from ground potential through contacts 172 and 248, the lower winding of switch relay 240 and rotary magnet RM203 to negative battery. Due to the impedance of this circuit, the rotary magnet RM203 does not operate. Further, R240 applies ground potential at contacts 245 to the control conductor 303 extending through the C wiper, bank contacts, conductor 303D to the line circuit 316 and party line 315 thereby indicating to other connectors that the party line 315 is busy. Upon operating, the switch relay R240 completes at contacts 243 a circuit for applying negative battery to line conductor 301 including contacts 221, the upper winding of relay R220 and contacts 236. Additionally, switch relay R240 completes at contacts 249 a circuit for operating transfer relay R210, this circuit extending from ground potential through contacts 214, 227 and 249 and the upper winding of transfer relay R210 to battery. Moreover, the operated switch relay R240 interrupts contacts 241 and prepares at contacts 242 a circuit described hereinafter for extending ring-back tone from conductor 255 to the calling line 101.

Thereafter, the transfer relay R210 operates completing at contacts 212 a hold circuit for energizing the upper winding thereof, including the contacts 172, resistor 217, and contacts 212, 227 and 249. Further, the operation of transfer relay R210 completes at contacts 211 a circuit extending from negative battery through the winding of test relay R230 to the EC conductor 304 at contacts 271. Thereafter, the interrupted ground applied by marking conductor M1 to the EC bank contact associated with called party station T56 is extended at the EC wiper to conductor 304. In response to the interrupted ground potential on the conductor 304, R230 operates and restores and during the operation periods completes at contacts 231 the circuit hereinbefore mentioned for extending ring-back tone to negative line conductor 201 and thence to the calling party line 101, and completes at contacts 235 a circuit including the upper winding of relay R220 and contacts 221 for applying a ringing potential from conductor 342 to line conductor 301. As this circuit is completed only during the intervals of interrupted ground from M1, only the ringing signal matched to the ground pulse, that is, $f1$, is transmitted to conductor 301 and thence to line 315, and because the ringer at station T56 is the only one on the line tuned to this frequency, only T56 is rung.

Thus if the called party is idle, switch relay 240 is operated and locked by its holding circuit, ground potential is applied to the C conductor 303, transfer relay R210 is operated, thereby completing a circuit through R230 and causing R230 to operate intermittently in response to the interrupted ground pulse applied to the EC conductor 304 whereby ring-back tone is applied to the calling line 101 intermittently and a frequency ringing signal is applied to the called line 315.

In response to the ringing signal, the called subscriber at subscriber station T56 answers thereby interrupting the ringer circuit for 318 and completing the circuit across party line 315 for energizing the ring cut-off relay R220, the circuit including ground at contacts 223, conductor 302, party line 315, receiver-transmitter 317, conductor 301, contacts 221 and the upper winding of relay R220 to negative battery at RM203. Because of the impedance in the circuit, rotary relay RM203 does not operate. Ring cut-off relay R220 now operates completing at contacts 226 a holding circuit for the lower winding thereof, and in addition contacts 221 and 223 are interrupted and contacts 222 and 224 are completed thereby causing the connector to switch through and to connect the negative line conductor 301 and positive line conductor 302 to conductors 201 and 202, respectively. At the same time, contact 227 is interrupted thereby causing transfer relay R210 to release, contact 211 to be interrupted and test relay R230 to be released. When test relay R230 releases, the ring-back tone circuit to conductor 201 is interrupted at contacts 231 and the ringing circuit is further interrupted at contacts 234 and 235. Finally, the ring cut-off relay R220 completes at contacts 222 and 224 a loop circuit for energizing in series the upper and lower windings of the reversed battery relay R150. This circuit extends from ground potential at the lower winding of relay R150 to battery potential at the upper winding of the relay and includes conductors 201 and 202 as switched through to the called party loop at contacts 222 and 224. When this circuit is completed, the reverse battery relay R150 operates to reverse at contacts 151, 152, 153 and 154 the polarity of the connection between the upper and lower windings of the line relay R160 and the line conductors of the subscriber line 101 extending to the calling subscriber station S. The reversal of polarity over the line conductor of the subscriber line 101 may be employed in the line circuit 102 for metering or for other uses in a conventional mode, not illustrated. Finally, the loop circuit extending from the calling subscriber station S to the upper and lower windings of the line relay R160 is operatively connected by capacitors 204 and 205 to the loop circuit extending between the called first party station T56 and the upper and lower windings of the reverse battery relay R150 whereby the subscriber at the calling subscriber station S and the subscriber at the called first party station T56 may converse with each other.

At the conclusion of the established connection, when the subscriber at the calling subscriber station S disconnects, the loop circuit extending to the line relay 160 is interrupted causing the latter relay to restore and effect restoration of the hold relay R170 shortly thereafter, the latter relay being of the slow to release type. When the subscriber at the called first party station T56 disconnects, the loop circuit extending to the reverse battery relay R150 is interrupted causing the latter relay to restore. Upon restoring, the reverse battery relay R150 and hold relay R170 respectively complete at contacts 156 and 174 the previously traced circuit for operating the release magnet M140; whereupon, the Strowger mechanism 300 is released in a manner previously explained. Also, upon restoring, reverse battery relay interrupts at the contacts 155 a multiple hold circuit for maintaining operated the ring cut-off relay R220 and the switch relay R240. Switch relay R240 restores a ring cut-off relay, R220 restores shortly thereafter, this relay being of the slow to release as well as of the slow to operate. When ground potential is removed from the control conductor 203 of finder 105 as a consequence of the restoration of hold relay R170, the finder 105 is released and the line circuit 102 is controlled to mark the subscriber line 101 as idle to the connectors 200, etc. having access thereto.

At this time, the connector 200 is completely released, the line circuit 316 is released and controlled to mark the party line 315 as idle to the connectors 200, etc. having access thereto.

Accordingly, at this time, the established connection between the calling subscriber station S and the called party station T56 is released and all of the apparatus involved therein is completely released and available for further use.

Now assume that at the conclusion of the established connection the called first party line subscriber at station T56 disconnects, the loop circuit extending from reverse battery relay R150 is interrupted causing the latter relay to restore. Then when the calling subscriber station S disconnects, the loop circuit extending to the line relay R160 is interrupted causing the latter relay to restore and effect restoration of the hold relay R170 shortly thereafter. In the manner as described above, the Strowger mechanism 300 is released and restored, the finder 105 is released, the line circuit 102 marks the subscriber line 101 as idle to the connectors 200, etc. and the line circuit 316 marks the subscriber party line 315 as idle. Accordingly, the connector is released and the established connection between the calling subscriber station S and the called party station T56 is released and all the apparatus involved therein is available for further use.

Should the subscriber at the calling subscriber station S initiate a call to any one of the other stations, T57, T58 or T59, on the party line 315, the operation of the telephone system will be substantially the same as described above. If, for example, the calling subscriber should dial the directory numbers 57, the Strowger mechanism 300 will connect to the fifth level and the seventh set of contacts in the contact bank. The ringer at the called party line station T57, being of the harmonic type, will respond to the ringing frequency $f2$, which may be, for example, 54 cycles, applied to the party line 315 through the connector 200 in cooperation with interrupted ground pulse applied by marking conductor M2 to the EC contact in the seventh set of contacts on the fifth level of the contact bank. As pointed out above, the joint application of this interrupted ground pulse and the ringing frequency to the connector 200 will permit a transmission of the ringing frequency $f2$ to the party line 315 and the consequential ringing at the party station T57. It can be easily seen that party substations T58 and T59 may be called and rung in a similar manner by means of the interrupted pulse and ringing frequency group provided by the ringing interrupter 340.

Release of the switching equipment on completed or uncompleted calls to the stations T57 through T59 is performed in the manner described heretofore.

Should the subscriber at station S desire connection to the P. B. X board 330 which is served by a plurality of trunks, here designated as four but for which the switching connections of only the first and last trunks are shown, the subscriber will dial the directory number 06. In response to the dialing of the first digit 0, the connector of the Strowger mechanism 300 will be operated as described heretofore with reference to the dialing of the party line station T56 except that the Strowger mechanism selects the "0" level in the contact bank. At this level, the normal post springs NP205 are closed thereby preparing level relay R270 for operation as described hereinafter. Thereafter, the second digit 6 of the directory number 06 is dialed causing the wiper set of Strowger mechanism 300 to search out the sixth set of contacts in the "0" level of the contact bank. At this contact set, the wipers are connected to the first of four trunks located consecutively on this level. Also, during the dialing of the second digit, the control relay R250 is operated thereby completing at contacts 254 a circuit for operating level relay R270 extending from ground potential through contacts 172, 254 and NP205 the winding of R270 to battery potential. Level relay R270 operates thereby closing an obvious holding circuit at contact 274 and causing contacts 272 and 273 to close in order to prepare the connector for testing the first trunk for idle or busy condition.

Now assuming that the first trunk is busy, ground potential is returned from trunk circuit 322 over the C conductor 303A to the C contact in the contact bank. In this contact set, as in the two succeeding contacts sets connected to the P. B. X trunks, the C and EC contacts are strapped. Thus in this instance, ground potential is returned to the C and EC wipers of the Strowger mechaism 300. After the second digit has been dialed and after the control relay R250 has restored but before control relay R260 has restored, ground potential from the C wiper is applied from conductor 303 through a circuit including contacts 263 and the winding of test relay R230 to battery potential thereby operating test relay R230. Relay R230 completes at contacts 234 a circuit for extending the strapped ground potential from the EC wiper through conductor 304, contacts 272, 265, 234 and 204, and the winding of step relay R280 to battery potential. Step relay R280 is operated and completes at contacts 282 an obvious circuit for operating rotary magnet RM203. Rotary magnet RM203 operates causing the Strowger mechanism 300 to step to the next, or seventh, contact set and at the same time interrupts contacts 204 causing the rotary magnet to become inoperative. In the event that the second trunk connected to the seventh contact set of the banks is busy, the rotary magnet RM203 is operated in a manner as described above causing the wiper set of the Strowger mechanism 300 to make an additional step to the eighth contact set. A similar test is performed here and in the event that a third trunk associated with the eighth contact set is busy, rotary magnet RM203 is again operated causing the wiper set to step to the ninth contact set associated with the fourth trunk. At the ninth contact set, the C and EC contacts are not strapped and the trunk testing function is completed in a manner as described with reference to the testing of the party line 315. Assuming that the fourth trunk is busy, ground potential returned to the C wiper of Strowger mechanism 300 causes the test relay R230 to operate in a manner as described heretofore thereby returning at contacts 231 busy tone from conductor 254 to the finder 105, the calling line 101 to calling station S. Thereupon, the subscriber at S disconnects effecting release of the connector and the associated switch circuits in a manner as previously explained.

In the event that the fourth trunk associated with the ninth contact set is idle, the appropriate connector switches are operated as explained heretofore for applying ringback tone to the calling line 101 and transmitting a ringing frequency to P. B. X 330. Ringing takes place with the frequency *f2*, for example 54 cycles, due to common ground conductor 341 being arbitrarily strapped to marking conductor M2 in the ringing interrupter. This interrupting ground is transmitted via conductor 341 to the test relay R230 by virtue of the operation of the level relay R270 closing contact 273. It is obvious, of course, that the P. B. X level may be adapted to ring at any of the frequencies transmitted from the ringing interrupter 340 and the common ground conductor 341 may be strapped accordingly.

Ringing takes place at the P. B. X station 330 and when the operator closes the cord circuit the connector switches through completing the conversation connection between the called P. B. X station 330 and the calling station S in a manner as previously explained with reference to the call to station T56. Upon completion of the conversation, the connector 200 is released in a manner as previously explained dependent upon whether the subscriber at S or the operator at 330 disconnects first.

In a call from the subscriber station S to party line station T50, the directory number 50 is dialed so that the connector selects the tenth contact set in the "5" level of the contact bank. Upon making contact with this set, the idle or busy test is completed by connector 200 in a manner as previously explained. Assuming that the subscriber line 310 is idle, the switches in connector 200 are operated to complete a ringing circuit and the ringers at station T50 are operated at the frequency *f1*. Ringing takes place at the frequency *f1* due to the harmonic tuning of the ringer therein and the fact that the EC in the tenth contact set of the first level is strapped to the marked conductor $M_1$ associated with the frequency *f1* in ringing interrupter 340. Obviously, the EC contact in the tenth contact set could be strapped to any one of the four marking conductors, except $M_2$ for reasons pointed out hereinafter, and the ringer could be adapted to ring to the corresponding frequency. Upon answering at party line station T50, the connector switches through as described previously and upon completion of the conversation, release is accomplished in the previously explained manner.

In initiating a call from station S to party line substation T00, the directory number 00 is dialed whereupon the connector through operation of the Strowger mechanism 300 selects the tenth contact set in the "0" level of the contact bank which terminates in the subscriber party line 310. Thereupon, the connector makes a test of the idle or busy condition of party line 310 in the manner as previously explained. It will be remembered from the previous explanation that in the "0" level the springs NP205 is operated and after the dialing of the second digit, the level relay R270 is operated. Assuming that the called party line 310 is idle, ringing is controlled via the common ground conductor 341 due to the operated position of the level relay R270 causing the ringing frequency applied to the line 310 to be at the frequency *f2*. Ringing takes place at the frequency *f2* due to the fact that the interrupted ground pulses corresponding to this frequency from M2 where arbitrarily selected to control ringing on the "0" level as explained heretofore with reference to P. B. X ringing. When the subscriber at station T00 answers, the connector cuts off the ringing and switches through completing a conversation circuit between called party line 310 and calling 101. The release of the connector and switching circuits associated with the called and calling stations is completed in a manner as previously explained.

Due to the above described arrangement, a telephone system is provided for accommodating at a single connector a great variety of different kinds of subscriber service including individual line service, party line service and P. B. X trunk service including automatic P. B. X trunk hunting. Also, it is apparent that through the use of the use of the ringing control system described different sub-stations on same party line may be selectively connected to different levels in the contact bank and may be connected particularly to unused contact sets on the P. B. X level. Thus it may be that the directory numbers of individual stations on a party line need not be consecutive but be determined by the vacancies in the contact sets in a contact bank. The advantage of such an automatic telephone system include that it will provide for compact automatic exchanges serving a variety of subscriber needs and also provide for efficient use of switching equipment in such exchanges.

It is understood that the above-described embodiment is merely an illustration of the principles of the invention and that a person skilled in the art may devise other modifications and improvements without deviating from spirit and scope of the invention.

What is claimed is:

1. A telephone system comprising a calling line and a party line adapted to serve a given number of stations, and said party line provided with a pair of line conductors and a control conductor, a signaling conductor, a given number of marking conductors respectively corresponding to said stations, a generator for applying in timed sequence in repeated cycles a given number of signals respectively corresponding to said stations to said signaling conductor and a marking potential to said marking conductors, whereby a particular signal is applied to said signaling conductor simultaneously with the application of said marking potential to the corresponding particular marking conductor, a switch including a corresponding number of contact sets each provided with a pair of line contacts and first and second control contacts, said pairs of line contacts commonly terminating the line conductors of said party line, said first control contacts commonly terminating the control conductor of said party line, and said second control contacts respectively terminating said marking conductors, means for selectively operating said switch to select anyone of said contact sets, means included in said switch for testing via the first control contact of said selected contact set the idle or busy condition of said party line, additional means included in said switch and response to the idle condition of said party line and to the application of said marking potential to the second control contact of said selected contact set for connecting said signaling conductor to one of the pair of line contacts of said selected contact set, whereby said signaling conductor is connected to said party line only and entirely during the time interval of the application of said marking potential to the second control contact of said selected contact set so as to selectively signal the corresponding one of said stations, a source of busy tone signals, and further means included in said switch and responsive jointly to the busy condition of said party line and to the application of said marking potential to the second control contact of said selected contact set for connecting said source of busy tone signals to said calling line, whereby a busy tone is returned to said calling line during the time interval of the application of said marking potential to the second control contact of said selected contact set.

2. A telephone system comprising a party line adapted to serve a given number of party stations and a plurality of individual lines adapted to serve a master station, a signaling conductor, a given number of marking conductors respectively corresponding to said party stations on said party line, a generator for applying in timed sequence in repeated cycles a given number of signals respectively corresponding to said party stations to said signaling conductor and a marking potential to said marking conductors, whereby a particular signal is applied to said signaling conductor simultaneously with the application of said marking potential to the corresponding particular marking conductor, a switch in a plurality of first positions having common access to said party line and respective access to said marking conductors, and in a plurality of second positions having respective access to said individual lines and common access to a particular one of said marking conductors, means for selectively operating said switch into any one of its first or second positions, and means included in said switch and responsive to the application of said marking potential to the selected one of said marking conductors for connecting said signaling conductor to said selected party line or to the selected one of said individual lines, whereby said signaling conductor is connected to said selected party line or to said selected one individual line only during the time interval of the application of said marking potential to the selected one of said marking conductors so as selectively to signal the corresponding one of said party stations on said party line or so as to signal said master station over said selected one individual line.

3. A telephone system comprising a party line adapted to serve a given number of stations and a plurality of individual lines adapted to serve a single station, a signaling conductor, a given number of marking conductors respectively corresponding to said stations on said party line, a generator for applying in timed sequence in repeated cycles a given number of signals respectively corresponding to said stations to said signaling conductor and a marking potential to said marking conductors, whereby a particular signal is applied to said signaling conductor simultaneously with the application of said marking potential to the corresponding particular marking conductor, a switch including in a first level a corresponding number of contact sets commonly terminating said party line and respectively terminating said marking conductors and including in a second level a plurality of contact sets respectively terminating said individual lines, means for selectively operating said switch to select any one of said contact sets in either one of said levels, a control device responsive to operation of said switch to said second level for connecting a given one of said marking conductors to said switch, and additional means included in said switch and responsive to the application of said marking potential thereto via the one of said marking conductors terminated at the selected one of said contact sets and via said given marking conductor connected thereto by said control device for selectively connecting said signaling conductor to the selected one of said contact sets, whereby said signaling conductor is connected to the selected one of said lines only during the time interval of the application of said marking potential to said switch so as to apply to said selected line the particular signal which is applied to the signaling conductor simultaneously with the application of said marking potential to said selected one of said marking conductors or to said connected given marking conductor.

4. A telephone system comprising a calling line, a plurality of trunk lines adapted to serve an operator position and a party line adapted to serve a given number of stations, each of said lines provided with a pair of line conductors and a control conductor, a signaling conductor, a given number of marking conductors respectively corresponding to said party line stations, a generator for applying in timed sequence in repeated cycles a given number of signals respectively corresponding to said party line stations to said signaling conductor and a marking potential to said marking conductors, whereby a particular signal is applied to said signaling conductor simultaneously with the application of said marking potential to the corresponding particular marking conductor, a switch including in a first level contact sets corresponding in numbers to said given number of party line stations and in a second level consecutive contact sets corresponding in number to said plurality of trunk lines, each said set provided with a pair of line contacts and first and second contacts, in said first level said pairs of line contacts commonly terminating the line conductors of said party line and said first control contacts commonly terminating the control conductor of said party line and said second control contact respectively terminating said marking conductors, in said second level said pairs of line contacts respectively and successively terminating said line conductors of said trunk lines and said first control contacts respectively and successively terminating said control conductors of said trunk lines, and said second control contacts respectively and successively terminating said control conductors of said trunk lines in said consecutive contact sets excepting the last consecutive contact set, means for selectively operating said switch to any one of said contact sets in either one of said levels, a control device responsive to operation of said switch to said second level for connecting a given one of said marking conductors to said switch, means included in said switch for testing via the first control contact of said selected contact set the idle or busy condition of the line terminated at said selected contact set, additional means included in said switch and responsive jointly to an idle line condition at said selective contact set and to the application thereto of said marking potential via the one of said marking conductors terminated at the selected contact set and via said given marking conductor connected thereto by said control device for connecting said signaling conductor to one of the line contacts of said selected contact set, whereby said signaling conductor is connected to the line terminated at the line contacts of said selected contact set only during the time interval of the application of said marking potential to said switch so as to apply to the selected line the particular signal coincident to said applied marking potential, and further means included in said switch and responsive to a busy condition on the first and second control contacts of a selected contact set in said second level for operating said operating means to advance said switch to the next succeeding contact set.

5. A telephone system comprising a calling line, a plurality of trunk lines adapted to serve an operator position station, a first party line including a given number of stations, and a second party line including stations not greater in number than said given number, each of said lines including a pair of line conductors and a control conductor, a signaling conductor, a given number of marking conductors respectively corresponding to said given number of party line stations, a generator for applying in timed sequence in repeated cycles a given number of signals respectively corresponding to said given number of stations to said signaling conductor and a marking potential to said marking conductors, whereby a particular signal is applied to said signaling conductor simultaneously with the application of said marking potential to the corresponding particular marking conductor, connector means including contact sets arranged in a first and a second level, each set including a pair of line contacts and a first and a second control contact, a wiper set to selectively contact said contact sets, a wiper motor to drive said wiper set over said contact sets in said levels, and a level switch operated when said wiper set is at said second level, said line contacts and first control contacts of consecutive contact sets in said second level respectively terminating said line conductors and control conductors of said trunk lines, and said second control contacts of said consecutive contact sets excepting the last contact set being connected to said first control contacts, said line contacts and first control contact of an additional contact set in said second level respectively terminating the line conductors and control conductor of said first party line, said line contacts and first control contacts of a given number of contact sets in said first level commonly terminating said line conductors and control conductor of said second party line, said second control contacts of said sets in said first level respectively terminating said marking conductors, said line contacts and first control contacts of other contact sets in said first level commonly terminating said line conductors and control conductor of said first party line, and said second control contacts of said other contact sets respectively terminating said marking conductors other than a first marking conductor, said level switch terminating said first marking conductor for connecting said marking conductor to said connector when said wiper set is at said second level, test means included in said connector for testing via the first control contact of said selected contact set the idle or busy condition of the line terminated thereat, a signaling circuit included in said connector and responsive jointly to an idle line condition at the selected contact set and to the application thereto of said marking potential via either the one of said marking conductors terminated at said selected contact set or via said first marking conductor connected thereto by said level switch for connecting said signaling conductor to the line terminated at the line contacts of said selected set, whereby said signaling conductor is connected to the selected line only during the time intervals that said marking potential is applied to said signaling circuit, control means included in said connector and connected to said wiper motor and responsive to a busy condition on said control conductor terminated at said first and second control contacts in a selected second level contact sets for operating said wiper set to advance said set to the next consecutive contact set, and busy tone means included in said connector and responsive jointly to a busy line condition at the selected contact set and to the application thereto of said marking potential for applying busy tone to the calling line, whereby busy tone is applied to said calling line during the time interval that said marking potential is applied to said connector.

6. A telephone system comprising a calling line, a plurality of trunk lines including therein a group of trunk lines serving an operator position station, each of said lines being provided with a pair of line conductors and a control conductor, said control conductor carrying thereon an indication of the idle or busy condition of the corresponding line, a connector switch including a first level of consecutive contact sets respectively terminating said group of trunk lines and contact sets in other levels respectively terminating the other of said trunk lines, each of said contact sets including a pair of line contacts and a first control contact respectively terminating the pair of line conductors and the control conductor of the corresponding line, in said first level the ones of said consecutive contact sets other than the last one thereof each including a second control contact connected to the control conductor of the corresponding trunk line, a wiper set for selectively engaging said contact sets, a wiper motor for driving said wiper set over the contact sets in said levels, a level switch operated when said wiper set is at said first level, a level relay operated in response jointly to the operation of said level switch and to the selection of a one of said contact sets in said first level, a test relay operative from the first control contact of the selected contact set and operated in response to the busy condition of the connected trunk line, and a step relay rendered operative in response jointly to the operation of said level relay and said test relay and operated thereafter from the second control contact in said selected contact set in response to a busy condition indication thereat for operating said wiper motor, whereby said wiper set is stepped into engagement with the next consecutive contact set in said level.

7. The telephone system set forth in claim 6 and further comprising a source of busy tone and means responsive to the operation of said test relay and to the absence of a busy condition indication on the second control contact of said selected contact set for returning busy tone to said calling line.

8. A telephone system comprising a plurality of trunk lines serving an operator position station, a party line including a given number of stations thereon, each of said lines being provided with a pair of line conductors and a control conductor, said control conductor carrying thereon an indication of the idle or busy conditions of the corresponding line, a signaling conductor, a given number of marking conductors respectively corresponding to said party lines, a generator for applying in timed sequence in repeated cycles a given number of signals respectively corresponding to said party line stations to said signaling conductor and a marking potential to said marking conductors, whereby a particular signal is applied to said signaling conductor simultaneously with the application of said marking potential to the corresponding particular marking conductor, a connector switch including in a first level contact sets connecting said party line on a terminal-per-station basis and in a second level consecutively arranged contact sets serving said operator station on a terminal-per-line basis, each of said contact sets including a pair of line contacts terminating the line conductors of the respectively associated line and a first control contact terminating the control conductor of corresponding line and a second control contact, said second control contacts in said first level respectively terminating said marking conductors and in said second level being connected to the control conductor of the correspondingly terminated trunk line except in the last of said consecutive contact sets, a wiper set for selectively engaging said contact sets, a wiper motor for driving said wiper set over the contact sets in said levels, a level switch operated when said wiper set is at said second level, a level relay operated in response jointly to the operation of said level switch and to the selection of a one of said contact sets in said second level for connecting a given one of said marking conductors to said connector switch, a test relay, a switch-through relay, means responsive to the selection of a contact set having a busy condition indication on the first control contact thereof for operating said test relay and responsive to the selection of a contact set having an idle condition indication on the first control contact thereof for operating said switch-through relay and for thereafter operating said test relay during the periods of the marking potential applied to said connector switch via the second control contact of said contact set or via said level relay, busy means responsive to the operation of said test relay in the absence of operation of said switch-through relay for rendering a busy indication, means responsive to the conjunct operation of said test relay and switch-through relay for connecting said signaling conductor to one of the line contacts of said contact set during the periods of the applied marking potential, and a step relay rendered operative in response jointly to the operation of said level relay and to the operation of said test relay in the absence of operation of said switch-through relay and operated thereafter in response to a busy condition indication on the second control contact of said selected contact set for operating said wiper motor, whereby said wiper set is stepped to the next consecutive contact set.

References Cited in the file of this patent

UNITED STATES PATENTS

| | | |
|---|---|---|
| 2,633,496 | Duhamel et al. | Mar. 31, 1953 |
| 2,702,831 | Elliott et al. | Feb. 22, 1955 |